United States Patent
Michel et al.

(10) Patent No.: US 7,593,694 B2
(45) Date of Patent: Sep. 22, 2009

(54) DATA TRANSMISSION METHOD WITH A LOWER PROBABILITY OF ERRONEOUS REJECTION OF DATA

(75) Inventors: Jürgen Michel, München (DE); Bernhard Raaf, Neuried (DE)

(73) Assignee: Siemens Aktiengesellschaft, Munich (DE)

(*) Notice: Subject to any disclaimer, the term of this patent is extended or adjusted under 35 U.S.C. 154(b) by 162 days.

(21) Appl. No.: 10/573,760

(22) PCT Filed: Sep. 13, 2004

(86) PCT No.: PCT/EP2004/052148
§ 371 (c)(1),
(2), (4) Date: Mar. 29, 2006

(87) PCT Pub. No.: WO2005/032194
PCT Pub. Date: Apr. 7, 2005

(65) Prior Publication Data
US 2006/0252379 A1 Nov. 9, 2006

(30) Foreign Application Priority Data
Sep. 29, 2003 (DE) ................. 103 45 638

(51) Int. Cl.
*H04B 7/00* (2006.01)
*H04M 1/00* (2006.01)
*H04M 1/38* (2006.01)

(52) U.S. Cl. .................. 455/70; 455/69; 455/550.1; 455/556.2; 455/561

(58) Field of Classification Search ............ 455/68–70, 455/101–103, 218, 222, 224, 226.1, 418–420, 455/434, 455, 464, 507–517, 524–525, 550.1, 455/556.2, 88, 450–451, 452.1–452.2, 557–558, 455/560–561; 370/225, 227–228, 280, 294, 370/318, 326, 328–330, 341, 345, 431, 496, 370/498, 321–322, 337–338, 347–350
See application file for complete search history.

(56) References Cited

U.S. PATENT DOCUMENTS 6,141,784 A * 10/2000 Davis et al. ................. 714/748

(Continued)

FOREIGN PATENT DOCUMENTS

DE 102 29 640 A1 7/2002

(Continued)

OTHER PUBLICATIONS

3GPP TS 25.214 V5.5.0 (Jun. 2003), p. 37, Chapter 6A, 1.1.

(Continued)

*Primary Examiner*—Meless N Zewdu
(74) *Attorney, Agent, or Firm*—Staas & Halsey LLP

(57) ABSTRACT

A method transmits data between a base station and a terminal in a communication system. According to said method, data is transmitted subdivided into time segments (Zs,R) from the base station (HS-DSCH) that is jointly used by several terminals via the base station informs the terminals, and the base station informs the terminal via one of at least two control channels method encompasses the following: the at least two control channels (HS-SCCH1, HS-SCCH2) are monitored by the terminal; the terminal receives the piece of control information on a first of the at least two control channels (HS-SCCH1) within a first time segment (ZS1, R1); an individual decision parameter is generated for each of the parts (P1, P2) of control information based on the content of the respective part (P1, P2) of control information: an overall decision parameter is determined based on the individual decision parameters; data received on the data channel (HS-DSCH) and the piece of information received on the control channel (HS-SCCH1) are rejected in accordance with the overall decision parameter.

19 Claims, 1 Drawing Sheet

U.S. PATENT DOCUMENTS

| | | | |
|---|---|---|---|
| 6,301,249 B1* | 10/2001 | Mansfield et al. | 370/394 |
| 2003/0035403 A1* | 2/2003 | Choi et al. | 370/342 |
| 2003/0189918 A1* | 10/2003 | Das et al. | 370/349 |
| 2003/0192003 A1 | 10/2003 | Das et al. | |
| 2006/0252379 A1* | 11/2006 | Michel et al. | 455/70 |

FOREIGN PATENT DOCUMENTS

| | | | |
|---|---|---|---|
| EP | 1 248 485 A1 | 10/2002 | |
| EP | 1 355 430 A1 | 10/2003 | |
| EP | 1 427 245 A2 | 6/2004 | |
| EP | 1 517 499 A2 | 3/2005 | |
| EP | 1 594 328 A1 | 11/2005 | |

OTHER PUBLICATIONS

Fauconnier, Denis: "LS on delivery of wrong data to upper layers for HSDPA" 3GPP TSG-RAN WG1 No. 31, No. 030336, Feb. 21, 2003, XP002319294, Tokyo, Japan.

Siemens: "Clarification of HS-SCCH reception", 3GPP TSG-RAN WG1 Meeting No. 34, No. 031113, Oct. 10, 2003, XP002319290, Seoul, Korea.

Panasonic: Clarification of HS-SCCH reception, 3GPP TSG RAN WG1 meeting, No. 33, Aug. 8, 2003, R1-030555, Othara, 2003.

* cited by examiner

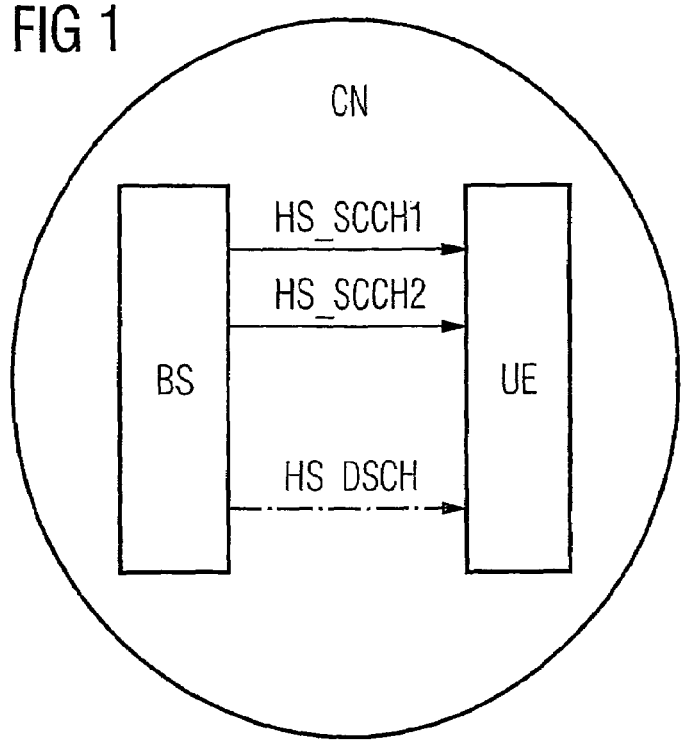

DATA TRANSMISSION METHOD WITH A LOWER PROBABILITY OF ERRONEOUS REJECTION OF DATA

CROSS REFERENCE TO RELATED APPLICATIONS

This application is based on and hereby claims priority to PCT Application No. PCT/EP2004/052148 filed on Sep. 13, 2004 and German Application No. 10345638.4 filed on Sep. 29, 2003, the contents of which are hereby incorporated by reference.

BACKGROUND OF THE INVENTION

The invention relates to a data transmission method in a communication network, especially cellular radio network, in which data, especially data packets of a packet-oriented data service, are transmitted over a data channel jointly used by several terminals and several jointly used control channels are used for signaling the specific mobile station(s) for which the data is intended.

In UMTS (Universal Mobile Telecommunication System) data packets are sent to User Equipment (UE) over the High-Speed Downlink Shared Channel (HS_DSCH). The associated control information is transmitted in parallel over the High-Speed Shared Control Channel (HS_SCCH). A maximum of four of these HS_SCCHs are assigned to a mobile station. So that the receiving mobile station can recognize that the information on the HS_SCCH and the data on the HS_D-SCH is intended for it, the control information is linked to identification information specific to a mobile station. For a more precise definition of terms the reader is referred to the description of the Figures below.

In UMTS the HS_DSCH is shifted in relation to the HS_SCCH by two time slots and three time slots of both the HS_SCCH and of the HS_DSCH correspond to one information unit of the physical layer (the length of an information unit is referred to as a subframe).

As well as the mobile station-specific identification information a unit of the HS_SCCH also contains information about
- the HS_DSCH spreading codes or channelization codes used,
- the modulation scheme, for example QPSK (Quadrature Phase Shift Keying) or 16 QAM (16 Quadrature Amplitude Modulation),
- the number of the data bits which are transferred from the physical layer to the next higher layer,
- the indication as to whether this is a first data transmission or a retransmission of the data,
- the HARQ process number,
- the information relating to the mapping specification of the data bits to the 16 QAM modulation used and regarding the rate adaptation pattern.

The information relates in each case to the HS_DSCH information unit transmitted 2 time slots later.

In UMTS a mobile station must monitor up to four HS_SCCHs if it has not already received data intended for it in the immediately preceding HS_SCCH unit. An example with 4 HS_SCCHs is selected below, but a different number is similarly possible, such as 2 or 3. Conversely, in the UMTS standard it is true to say that a mobile station which receives the control information intended for it on one of the HS_SCCHs, in the subsequent interval of the length of three time slots only monitors one HS_SCCH, this being the HS_SCCH on which the control information was previously received.

The reason for this is that it allows parts of the receiver hardware which will be needed for HS_SCCH receiving, in the event of data transmission on the HS_DSCH, to be able to be used for HS_DSCH receiving and thereby fewer resources are needed overall. This is referred to as the consecutive scheduling rule.

Furthermore different categories of mobile stations, i.e. mobile stations with different service features, are used in UMTS. As regards packet-oriented high-speed data transmission a mobile station is identified in accordance with its category, especially in the following capabilities
- the maximum number of HS_DSCH channelization codes which it can simultaneously receive and process in an HS_DSCH unit,
- the minimum period of time between two consecutive data transmissions on the HS_DSCH which it can process,
- the modulation scheme (QPSK, 16 QAM) which it can process, and further parameters.

In addition the physical layer is informed via signaling by higher layers of the OSI (Open system Interconnection) models about the number of Hybrid Automatic Repeat Request (HARQ) process and the maximum transport block size or packet size.

An example of inconsistent information in the case of UMTS is if the number of HS_DSCH channelization codes used transmitted in the HS_SCCH unit is greater than the maximum number of HS_DSCH channelization codes which the mobile station must be able to process in accordance with its category or/and if the number of the HARQ process is higher than the number of HARQ processes configured for this mobile station.

If a mobile station establishes that the information in an HS_SCCH unit which it evaluates in accordance with its identification as intended for it does not contain consistent information, the physical layer can in this case reject the information and not forward it. The advantage of this method is that the likelihood of a transfer of erroneous packets from the physical layer to higher layers is reduced by those packets which appear to contain inconsistent information being filtered out. Since the inconsistent control information itself is not passed on to higher layers since it is only needed in the physical layer, such filtering can only be performed in the physical layer. Inconsistent data can under some circumstances lead to serious malfunctions at higher layers, thus great importance has been placed in the UMTS specification on avoiding such errors as far as possible. In addition to further methods such as checksum tests, the consistency checking described is a method for avoiding such erroneous behavior.

It can now be the case that data which could actually have been correctly received is also rejected by such consistency checking: For example it can be the case that a mobile station is requested to used 5 HS_DSCH spreading codes or channelization codes which corresponds to its maximum capability. Errors in transmission can now mean that the mobile station incorrectly believes that it has to receive 15 codes. If, instead of this, it now receives the maximum possible number of codes, namely 5, it would have corrected the incorrect transmission of the control information using this method. The mobile station should not attempt however to correct errors in control information but instead should detect errors and reject the entire data frame.

The disadvantage of this is that data can be rejected incorrectly.

SUMMARY OF THE INVENTION

Using this related art as its starting point, one possible object of the present invention is to create a simple option for reducing the erroneous rejection of data in a communication network.

The inventors propose a communication network in which data is transmitted between a terminal and a base station over a data channel which can be used by one or more, i.e. at least two, terminals. The data is subdivided into individual time segments in such cases. Furthermore a number, i.e. at least two control channels, are provided on which the terminal listens in, and on one of these control channels the terminal will be informed via control information if a data transmission is to be undertaken later, i.e. in a subsequent time slot over the data channel.

If the terminal receives the control information on one of the control channels, it analyzes its contents, especially as to whether the control information is actually directed to it. The control information has a plurality of parts, that is at least one first control information component and one second control information component. In this case the first control information component can be received in a first time segment and the second control information component in a subsequent second time segment.

Each of these pieces of control information is analyzed, and on the basis of this analysis, a decision parameter is generated for each of these pieces of control information. An overall decision parameter for the control information is determined by these individual decision parameters, which is then used to determine whether the data received on the data channel is to be rejected, i.e. not processed further, especially not forwarded to higher layers of the OSI model. This rejection can for example be undertaken in a third time segment following the first or the second time segment.

The fact that the overall decision parameter is composed of a plurality of individual decision parameters reduces the probability of an incorrect decision.

The method is especially advantageous if the overall decision parameter is also used to define the control channel or control channels on which the terminal is to listen in in one or more subsequent time segments, e.g. the third time segment. This has the advantage that the computing effort in the terminal is reduced if the latter no longer has to listen in on all control channels but only on one or more specific control channels.

In particular the terminal can continue to listen on the at least two above-mentioned control channels, for example if a piece of control information is classified as not relating to the terminal (for example because the data is not able to be processed by the terminal).

In a further development there is provision for the overall decision parameter to be able to assume two values, for example a positive value if the control information relates to the terminal and a negative value if the control information does not relate the terminal. Thus for example the decision can be made as to whether the terminal listens in on all control channels or only on the control channel on which it has received control information.

The overall decision parameter can especially be composed of the individual decision parameters such that it only then assumes a positive value if all the individual decision parameters are also positive.

The communication system involved can for example be a UMTS system.

In relation to the situation depicted at the start in UMTS the probability is thus reduced of the transmission immediately following the transmission of an inconsistent piece of information (an HSDPA frame) being missed by a terminal or a mobile station. The starting point for this is the consecutive scheduling rule described above and the fact that it is highly probable that there is an HS_SCCH false alarm if the decoding of the HS_SCCH information unit supplies inconsistent information. Thus the situation is prevented in which a false alarm on detection of the control channel prevents data of the next frame from being able to be received. Furthermore in a UMTS system as described at the start, the probability of detecting a false alarm is increased by the inclusion of further criteria for consistency checking. (A mobile station which only supports QPSK modulation with HSDPA can, by additionally performing a consistency check in relation to the modulation scheme in the HS_SCCH information unit directed to it, reduce the probability of a false alarm). A false alarm in this context occurs if a mobile station, on decoding the identification information, incorrectly assumes that the identification information matches its identification although no transmission has actually been performed by the base station for this mobile station, but instead a transmission can have been performed for another mobile station or even no transmission at all.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1: a communication system with a base station and a terminal; and

FIG. 2: a subdivision of control channels and data channels into 4 time slots

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Before the figures are presented in detail an initial explanation will be provided for a plurality of terms used:

A communications system or communication network is to be seen as a structure for the exchange of data. This can for example involve a cellular mobile radio network, such as the GSM (Global System of Mobile Communications) or the UMTS (Universal Mobile Telecommunications System) network. A communication network comprises at least two connection nodes, which means that this term also covers point-to-point connections.

Terminals and base stations are generally provided in a communication system, these being connected to each other via a radio interface. In UMTS the communication system or radio transmission network at least features base stations, also referred to here as NodeBs, as well as Radio Network Controllers (RNC) for connecting the individual base stations. The Universal Terrestrial Radio Access Network UTRAN is the radio part of an UMTS network in which the radio interface is also made available for example. A radio interface is always standardized and defines the totality of the physical and protocol definitions for data exchange, for example the modulation method, the bandwidth, the frequency range, access methods, security procedures and also switching techniques. The UTRAN thus comprises at least base stations as well as at least one RNC.

A base station is a central unit in a communications network, which in the case of a cellular mobile radio network, serves terminals within a cell of the mobile radio network via one or more radio channels. The base station provides the air interface between base station and terminal. It takes over the handling of radio operation with the mobile subscribers and monitors the physical radio connection. In addition it transfers payload and status messages to the terminals. The base station does not have a switching function but merely a service provision function. A base station comprises at least one transceiver unit.

A terminal can be any communication terminal via which a user communicates in a communication system. This includes for example mobile radio terminals such as mobile telephones or portable computers with a radio module. A terminal is often also referred to as a "mobile station" (MS) or as User Equipment (UE) in UMTS.

In mobile radio a distinction is made between two connection directions. The downlink (DL) direction identifies the direction of transmission from the base station to the terminal. The uplink (UL) direction identifies the opposite direction of transmission from terminal to base station.

In broadband transmission systems, for example a UMTS mobile radio network, a channel is one part of an overall transmission capacity available. Within the context of this application a wireless communication path is referred to as a radio channel.

In a mobile radio system, for example UMTS, there are two types of physical channels available for transmission of data: Dedicated channels and common channels. With dedicated channels a physical resource is reserved only for the transmission of information for a specific terminal. With common channels information can be transmitted which is intended for all terminals, for example the Primary Common Control Physical Channel (P-CCPCH) in the downlink or all terminals share a physical resource. This is the case with HS_PDSCH over which data is sent to a terminal depending on the connection quality at the terminal.

In mobile radio systems in accordance with UMTS for example, as well as circuit switched services, in which a connection is permanently allocated for its duration, packet switched services are also provided.

To co-ordinate the timing of the data transmission or of signaling procedures, a transmission is subdivided into timeslots or slots. A time slot in the UMTS system lasts for 0.666 ms.

A further time segment in UMTS, especially in connection with HSDPA, is a subframe containing 3 time slots. A frame as a further time segment in UMTS contains 15 time slots FIG. 1 shows a communication network CN. A base station sends data over the High-Speed Downlink Shared Channel (HS_DSCH) as data channel to a terminal or user equipment UE. It indicates a transmission on the first High-Speed Shared Control Channel HS_SCCH1 or on the second High-Speed Shared Control Channel HS_SCCH2 as its control channel. Two control channels are typically selected in the Figure but any number greater than two can also be selected. The terminal features at least one transceiver unit and a processor unit for processing the data.

Control information which can include a plurality of pieces of control information is sent out via the control channels.

FIG. 2 shows a typical timing structure of control channels HS_SCCH1 to HS_SCCH4 and a data channel HS_DSCH.

The four control channels are transmitted in parallel from the base station. Each of the four control channels HS_SCCH1 to HS_SCCH4 features a first part P1 on which a first piece of control information is transmitted and a second part P2 on which a second piece of control information is transmitted. Identifying information to identify the terminal can be accommodated in a first part P1, for example the identification number of the terminal. Only one data channel HS_DSCH is listed for example. Each of the channels is subdivided into subframes of which the first subframe R1 and a second subframe R2 are shown in the example. These subframes are further subdivided each into three timeslots ZS 1, ZS 2 and ZS 3.

The data channel HS_DSCH is offset in relation to the control channel by 2 timeslots. The first part of a control channel (HS_SCCH1-HSCCH4) is sent before the associated data channel HS_DSCH, with a gap of one time slot between the end of the control channel (HS_SCCH1-4) and the beginning of the data channel HS_DSCH. The second part P2 of the control channel HS_SCCH overlaps with the associated data channel HS_DSCH and does this by the length of one time slot. The exemplary embodiments depicted below relate to the UMTS standard, that is to a UMTS mobile radio network. In the labels the abbreviations already used above are used directly to identify the channels. The corresponding method can however also be applied to other standards for which the corresponding transmission methods are provided. The reader is also referred to the introductory explanations especially relating to consistency checking and to the following abbreviations:

HSDPA: High Speed Downlink Packet Access

HS_DSCH: High-Speed Downlink Shared Channel (HSDPA DL data channel)

HS_SCCH: High-Speed Shared Control Channel (HSDPA DL control channel).

A mobile station which only supports QPSK modulation with HSDPA can, by additionally performing a consistency check, as described at the beginning in relation to the modulation schemes, reduce the probability of false alarms in the HS_SCCH information unit directed to it.

A mobile station which receives an HS_SCCH Information Unit directed to it especially performs one or more of the consistency checks listed below:

The mobile station is to check whether the information "pber", that is the number of channelization codes used on the HS_DSCH, is less than or equal to the maximum number of codes which it can process.

The mobile station is to check whether the decoded modulation scheme is allowed in accordance with its capabilities.

If at least one of the above-mentioned consistency checks fails, the mobile station is to reject the data on the physical layer and behave as though no HS_SCCH information unit directed to it had been received, i.e. the monitoring of all four HS_SCCHs in the following HS_SCCH subframe is continued. This is also possible in time since the consistency checks described can be performed after the decoding of the first HS_SCCH time slot. This is still possible before the time at which the receive devices must be switched to receive the following HS_SCCH subframe. Furthermore the receive devices can only be switched to receive the HS_DSCH if this information is present since the receive devices can only then be switched to receive the correct channelization codes or channel coding information. Furthermore the mobile station should check whether the decoded HARQ process number and the decoded variable of the specified transport block is less than or equal to the maximum values transmitted from the higher layers via signaling. By contrast with the checks discussed in the previous paragraph, this check can only be made after the receipt of third time slot of the HS_SCCH subframe. At this point in time the receive devices and have already been switched to receive the HS_DSCH, so that in this case it is no longer possible, instead of the HS_DSCH, to monitor all four HS_SCCHs in the following HS_SCCH subframe. If at least one of the consistency checks fails the mobile station (physical layer) should reject the data, even if data has already been received on the HS_DSCH (at least partly).

The following methods are provided in particular:

a) A method for data transmission in a cellular radio network in which data packets of a packet-oriented data service are transmitted via a data channel shared by a plurality of mobile stations (HS_DSCH) and in which a plurality of shared control channels (HS_SCCH) are used to signal for which specific mobile station(s) the data is intended (and further parameters), with the data channel being delayed in time in relation to the control channels.

b) Furthermore a method as previously described, in which, after detection of the receipt of an HS_SCCH information unit on one of the shared control channels, receipt is only on the control channel (HS_SCCH) on which the immediately preceding information unit was received for a receiver unit in the immediately following subframe.

An information unit can especially be regarded here as a piece of control information.

c) Furthermore a method as previously described in which at least one part of the received HS_SCCH information unit is subjected to a consistency check, and in the event that at least one inconsistency is established, the data is not passed on from the physical layer to higher layers. Inconsistency means especially that the information concerned cannot be processed by the terminal.

d) Furthermore a method as previously described in which at least one part of a detected HS_SCCH information unit is subjected to a consistency check, and if an inconsistency is present, in the immediately following subframe data is received on a plurality of control channels (HS_SCCH), if an inconsistency is not present in the immediately following subframe, receiving is merely on the control channel (HS_SCCH) on which the HS_SCCH information unit was detected in the current subframe.

d1) A further development of this is especially a method as previously described in which at least two parts (first part, second part) of a detected HS_SCCH information unit are subjected to a consistency check and, if an inconsistency is present in one part (first part), the data is not passed on from the physical layer to higher layers, and in the immediately following subframe receiving is on a plurality of control channels (HS_SCCH), and if an inconsistency is present in the other part (second part) only the data is not passed on from the physical layer to higher layers.

d11) This method can be developed to the extent that if an inconsistency is not present, receiving in the directly following subframe is merely on the control channel (HS_S-CCH) on which the HS_SCCH information unit was detected in the current subframe.

d2) The method as illustrated under d) can be developed to the extent that the one part (first part) is sent before the data (HS_DSCH) and the other part (second part) overlaps at least partly in time with the data (HS_DSCH) or is sent after it in time.

e) Each of the methods can be developed so that the consistency check relates to the number of HS_DSCH channelization codes.

f) Furthermore the method can be modified so that a consistency check relates to the modulation scheme.

g) Furthermore a consistency check can be performed on the decoded information on the HS_SCCH relating to the number of data bits transferred from the physical layer to the next higher layer and/or the HARQ process number. HARQ process number is taken in this case to mean the process number for a specific transmission if a plurality of HARQ processes are running simultaneously.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for data transmission between a base station and a terminal in a communication system, comprising;

transmitting data divided into time segments from the base station to the terminal over a data channel shared by a plurality of terminals; and notifying the terminal from the base station via one of at least two control channels, the base station notifying the terminal through control information comprising a series of pieces of control information, the control information also being divided into time segments, the base station notifying the terminal as to when data will be sent on the data channel to the terminal, the method further comprising:

monitoring the at least two control channels at the terminal;

receiving the control information at the terminal on a first control channel of the at least two control channels in a first time segment; and generating an individual decision parameter for each of the pieces of control information on the basis of the content of the respective piece of control information;

wherein the control information transmitted over the first control channel has a first piece and a second piece of control information, the first piece of control information being transmitted two time segments before any data transmission on the data channel, and the second piece of control information being transmitted in at least one time segment subsequent to the first time segment;

a first individual decision parameter is generated for the first piece of control information and a second individual decision parameter is generated for the second piece of control information;

if the first individual decision parameter is negative, the data is not processed further and in the time segment directly following the first time segment all control channels are monitored; and if the first individual decision parameter is positive and the second individual decision parameter is negative, the data is not processed further and in a time segment directly following the time segment of the second individual decision parameter, only the first control channel is monitored.

2. The method according to claim 1 further comprising:

defining which of the control channels should be monitored in the time segment subsequent to the first time segment depending on an overall decision parameter.

3. The method in accordance with claim 2, wherein only the first control channel is monitored in the time segment subsequent to the first time segment if a positive overall decision parameter is determined; and all control channels are monitored in the time segment subsequent to the first time segment if a negative overall decision parameter is determined.

4. The method in accordance with claim 2, wherein the subsequent time segment is the time segment directly following the first time segment.

5. The method in accordance with claim 2, wherein the data is transmitted over the data channel in packets.

6. The method in accordance with claim 5, wherein
the first piece of control information identifies the terminal and
the second piece of control information contains at least one of data channel configuration information, HARQ information, information about a packet size used for data transmission, and information about modulation and coding schemes used to transmit the data.

7. The method in accordance with claim 6, wherein if a positive overall decision parameter is determined, data transmission via the data channel is delayed 2 time segments relative to the time segment in which the control information began.

8. The method in accordance with claim 7, wherein, if a negative overall decision parameter is determined, the data is not passed on to layers above the physical layer of the OSI model.

9. The method in accordance with claim 1, wherein
a positive overall decision parameter is generated if the control information is classified as relating to the terminal and
a negative overall decision parameter is generated if the control information is classified as not relating to the terminal.

10. The method in accordance with claim 1, wherein
a positive individual decision parameter is generated for the piece of control information if the piece of control information is classified as relating to the terminal and
a negative individual decision parameter is generated for the piece of control information, if the piece of control information is classified as not relating to the terminal.

11. The method in accordance with claim 10, wherein the overall decision parameter is determined to be positive if all individual decision parameters are positive.

12. The method in accordance with claim 1, wherein the data is transmitted over the data channel in packets.

13. The method in accordance with claim 1, wherein
the first piece of control information identifies the terminal and
the second piece of control information contains at least one of data channel configuration information, HARQ information, information about a packet size used for data transmission, and information about modulation and coding schemes used to transmit the data.

14. The method in accordance with claim 1, wherein if a positive overall decision parameter is determined, data transmission via the data channel is delayed in time relative to the time segment in which the control information began.

15. The method in accordance with claim 1, wherein if a positive overall decision parameter is determined, data transmission via the data channel is delayed 2 time segments relative to the time segment in which the control information began.

16. The method in accordance with claim 1, wherein, if a negative overall decision parameter is determined, the data is not passed on to layers above the physical layer of the OSI model.

17. The method according to claim 1, further comprising:
determining an overall decision parameter based on the generated individual decision parameters; and
selectively rejecting data received on the data channel and the control information received on the first control channel depending on the overall decision parameter.

18. A terminal comprising:
a receiver device to receive data; and
a processor unit configured to execute a method for data transmission between a base station and a terminal in a communication system, the method comprising:
transmitting data divided into time segments from the base station to the terminal over a data channel shared by a plurality of terminals; and
notifying the terminal from the base station via one of at least two control channels, the base station notifying the terminal through control information comprising a series of pieces of control information, the control information also being divided into time segments, the base station notifying the terminal as to when the data will be sent on the data channel to the terminal, the method further comprising:
monitoring the at least two control channels at the terminal;
receiving the control information at the terminal on a first control channel of the at least two control channels in a first time segment; and
generating an individual decision parameter for each of the pieces of control information on the basis of the content of the respective piece of control information, wherein
the control information transmitted over the first control channel has a first piece and a second piece of control information, the first piece of control information being transmitted two time segments before any data transmission on the data shared channel, and the second piece of control information being transmitted in at least one time segment subsequent to the first time segment;
a first individual decision parameter is generated for the first piece of control information and a second individual decision parameter is generated for the second piece of control information;
if the first individual decision parameter is negative, the data is not processed further and in the time segment directly following the first time segment all control channels are monitored; and
if the first individual decision parameter is positive and the second individual decision parameter is negative, the data is not processed further and in a time segment directly following the time segment of the second individual decision parameter, only the first control channel is monitored.

19. A cellular mobile radio communication network comprising:
a base station; and
a terminal for data transmission with the base station, the terminal comprising a receiver device to receive data and a processor unit configured to execute a method for data transmission between the base station and the terminal, the method comprising:
transmitting data divided into time segments from the base station to the terminal over a data channel shared by a plurality of terminals; and
notifying the terminal from the base station via one of at least two control channels, the base station notifying the terminal through control information comprising a series of pieces of control information, the control information also being divided into time segments, the base station notifying the terminal as to when the data will be sent on the data channel to the terminal, the method further comprising:

monitoring the at least two control channels at the terminal;

receiving the control information at the terminal on a first control channel of the at least two control channels in a first time segment; and generating an individual decision parameter for each of the pieces of control information on the basis of the content of the respective piece of control information, wherein the control information transmitted over the first control channel has first and second pieces of control information, the first piece of control information being transmitted two time segments before any data transmission on the data channel, and the second piece of control information being transmitted in at least one time segment subsequent to the first time segment;

a first individual decision parameter is generated for the first piece of control information and a second individual decision parameter is generated for the second piece of control information;

if the first individual decision parameter is negative, the data is not processed further and in the time segment directly following the first time segment all control channels are monitored; and if the first individual decision parameter is positive and the second individual decision parameter is negative, the data is not processed further and in a time segment directly following the time segment of the second individual decision parameter, only the first control channel is monitored.

* * * * *

UNITED STATES PATENT AND TRADEMARK OFFICE
CERTIFICATE OF CORRECTION

PATENT NO.          : 7,593,694 B2
APPLICATION NO.     : 10/573760
DATED               : September 22, 2009
INVENTOR(S)         : Jürgen Michel et al.

Page 1 of 1

It is certified that error appears in the above-identified patent and that said Letters Patent is hereby corrected as shown below:

Sheet 1 (FIG 1), Line 5, change "HS DSCH" to --HS_DSCH--.

Column 10, Line 36, change "data shared" to --shared data--.

Signed and Sealed this

Twenty-ninth Day of December, 2009

David J. Kappos
*Director of the United States Patent and Trademark Office*